(12) United States Patent
Evans et al.

(10) Patent No.: US 8,683,705 B2
(45) Date of Patent: Apr. 1, 2014

(54) DOSING SPOON

(75) Inventors: Scott Evans, Fairport, NY (US); Frank Tasber, Rush, NY (US)

(73) Assignee: UCB Manufacturing, Inc., Rochester, NY (US)

( * ) Notice: Subject to any disclaimer, the term of this patent is extended or adjusted under 35 U.S.C. 154(b) by 434 days.

(21) Appl. No.: 12/893,480

(22) Filed: Sep. 29, 2010

(65) Prior Publication Data

US 2012/0073147 A1    Mar. 29, 2012

(51) Int. Cl.
A47J 43/28  (2006.01)

(52) U.S. Cl.
USPC .................. 30/324; 30/327; 30/328

(58) Field of Classification Search
USPC .................. 30/324, 328, 327, 141, 149, 150; 73/429, 426
See application file for complete search history.

(56) References Cited

U.S. PATENT DOCUMENTS

| | | | | |
|---|---|---|---|---|
| 2,165,045 A | * | 7/1939 | Garside | 73/426 |
| 2,259,504 A | * | 10/1941 | Wilson et al. | 73/426 |
| 2,569,703 A | * | 10/1951 | Weiland | 73/429 |
| 2,626,526 A | * | 1/1953 | Chester | 73/429 |
| 2,826,078 A | * | 3/1958 | Setecka | 73/429 |
| 2,854,849 A | * | 10/1958 | Setecka | 73/429 |
| 3,013,436 A | * | 12/1961 | Dailey | 73/426 |
| 3,690,182 A | * | 9/1972 | Rodriguez | 73/429 |
| 5,460,042 A | * | 10/1995 | Tucker | 73/429 |
| D371,976 S | * | 7/1996 | Tucker | D10/46.3 |
| D375,353 S | | 11/1996 | Wolff | |
| 5,678,450 A | * | 10/1997 | Robbins et al. | 73/429 |
| D483,478 S | | 12/2003 | Carraher | |
| 6,662,454 B2 | | 12/2003 | Harrold | |
| D494,877 S | | 8/2004 | Kempe et al. | |
| 6,811,054 B1 | | 11/2004 | Moest et al. | |
| D501,046 S | | 1/2005 | Ray et al. | |
| D545,445 S | | 6/2007 | Klein | |
| D546,136 S | | 7/2007 | Smith et al. | |
| D586,535 S | | 2/2009 | Soliz | |
| D615,886 S | | 5/2010 | Pallotto | |
| 2011/0126619 A1 | * | 6/2011 | Robbins | 73/426 |

* cited by examiner

*Primary Examiner* — Omar Flores Sanchez
(74) *Attorney, Agent, or Firm* — McDonnell Boehnen Hulbert & Berghoff LLP

(57) ABSTRACT

A dosing spoon is provided with two bowl portions, each with a front end for oral insertion, a back end, and a top edge along the circumference of the bowl. The spoon also has a handle portion that extends between each bowl. The first and second bowl portions are sized and shaped to contain a 2.5 mL and a 5.0 mL dose, respectively, of a substance with a specific gravity in the range of about 1.1300-1.1700. A rib may be present on the bottom surface of the handle portion to provide both additional stiffening to the handle, as well as a de-nesting feature.

22 Claims, 4 Drawing Sheets

DOSING SPOON

BACKGROUND

1. Field of Patent Application

The present patent application is generally directed to metering medicine dosages, and particularly to dosing spoons to be used for administering accurate suspension medicine dosages.

2. Background

Dosing spoons are generally known. Such spoons are especially used for medicaments that may be self-administered by a patient. For example, a patient suffering from an ailment may require a certain amount of a liquid drug, and may use a dosing spoon to properly measure the exact amount of drug to take.

Dosing spoons are typically configured with bowls intended to hold a particular dosing volume, such that when a drug substance is filled to the top or peripheral edge of the spoon bowl, the desired amount of drug will be present. Water is often used as the measuring medium to determine the size and shape of the spoon bowl for a desired volume of substance. However, not all substances share the same density as water, and some substances are either more or less dense than water. The relative density is the ratio of density of a substance to the density of a given reference material. The term specific gravity is often used to mean the relative density with respect to that of water. The drug Tussionex®, for example, has an approximate relative density to the reference material water (i.e., specific gravity) of 1.1300-1.1700. Thus, the drug Tussionex® is denser than water.

When filled to the brim or top edge of a spoon, substances that are more dense than water will maintain more surface tension than water would, and will form a dome or an arc, raising above the plane formed by the top edge. This means that if the substance is filled to the top edge of the spoon bowl, there will actually be more substance in the spoon bowl than the amount intended to be delivered to a patient. Thus, due to the dome effect, a patient may be overdosed with a liquid drug.

Administering the exact dose is quite important, since the administration of a potentially incorrect dose of a medicament could result in injury or even death. Thus, one object of the present invention is to provide an improved dosing spoon which will afford improved means for precise measurement of the dosage of drugs comprising certain densities to be administered.

Another issue that arises with such dosing spoons is one of manufacture. During the manufacturing process, the spoon bowls tend to mate within each other, resulting in a "nesting" phenomenon. Each spoon bowl may be essentially friction-fit with the spoon bowls on either side, and it may be quite difficult to remove each spoon from its nested position. The process of separating and packaging the spoons is so difficult that it typically requires them to be manually packed. The ability for the spoons to be de-nested quickly and freely onto factory conveying equipment so as to allow for the packing process to be automated, repeatedly and without error, is an important factor in the cost effective and efficient running of a factory.

SUMMARY

According to an exemplary arrangement, a dosing spoon is provided. The spoon has a bowl portion with a front end for oral insertion, a back end, and a top edge along the circumference of the bowl. The spoon also has a handle portion with a first end and a second end, wherein the first end is connected to the back end of the bowl portion. The bowl is sized and shaped such that when liquid with a specific gravity in the range of about 1.1300-1.1700 is filled to the top edge, the liquid comprises a total volume of 2.5 mL in one instance, and 5.0 mL in another instance.

In an alternative arrangement, a dosage spoon is provided. The dosage spoon comprises a first bowl portion for oral insertion having a first volume, a front end, a back end, and a top edge along the circumference of the bowl. The dosage spoon also comprises a second bowl portion for oral insertion having a second volume that is greater than the first volume, a front end, a back end, and a top edge along the circumference of the bowl. The dosage spoon also comprises a handle portion having a first end and a second end, wherein the first end is connected to the first bowl portion and the second end is connected to the second bowl portion. When a substance with a specific gravity of about 1.1300-1.1700 is filled to the top edge of the first bowl, the first bowl contains a dose of 2.5 mL. When a substance with a relative density in the range of about 1.1300-1.1700 is filled to the top edge of the second bowl, the second bowl contains a dose of 5.0 mL.

In yet another alternative arrangement, a dosing spoon for accurate administration of a liquid drug is provided. The dosing spoon comprises a first bowl portion having a premeasured dosage volume, a front end for oral insertion, a back end, and a peripheral bowl edge. The spoon also comprises a second bowl portion having a premeasured dosage volume, a front end for oral insertion, a back end, and a peripheral bowl edge. The spoon has a handle portion comprising a planar plate that is defined by a first end, a second end, a first parallel edge and a second parallel edge. The planar plate has a top and a bottom. The first end is connected to the back end of the first bowl portion and the second end is connected to the back end of the second bowl portion. A rib extends essentially orthogonally from the bottom of the planar plate. The volume of the first bowl comprises approximately 2.53 cm$^3$, and the volume of the second bowl portion comprises approximately 5.03 cm$^3$. When filled to the first bowl peripheral edge with a substance comprising a specific gravity in the range of about 1.1300-1.1700, the amount of substance in the first bowl portion is 2.5 mL. When filled to the second bowl peripheral edge with the substance, the amount of substance in the second bowl portion is 5.0 mL.

These as well as other advantages of various aspects of the present invention will become apparent to those of ordinary skill in the art by reading the following detailed description, with appropriate reference to the accompanying drawings.

BRIEF DESCRIPTION OF THE DRAWINGS

Exemplary embodiments are described herein with reference to the drawings, in which.

DETAILED DESCRIPTION

Figure 1:
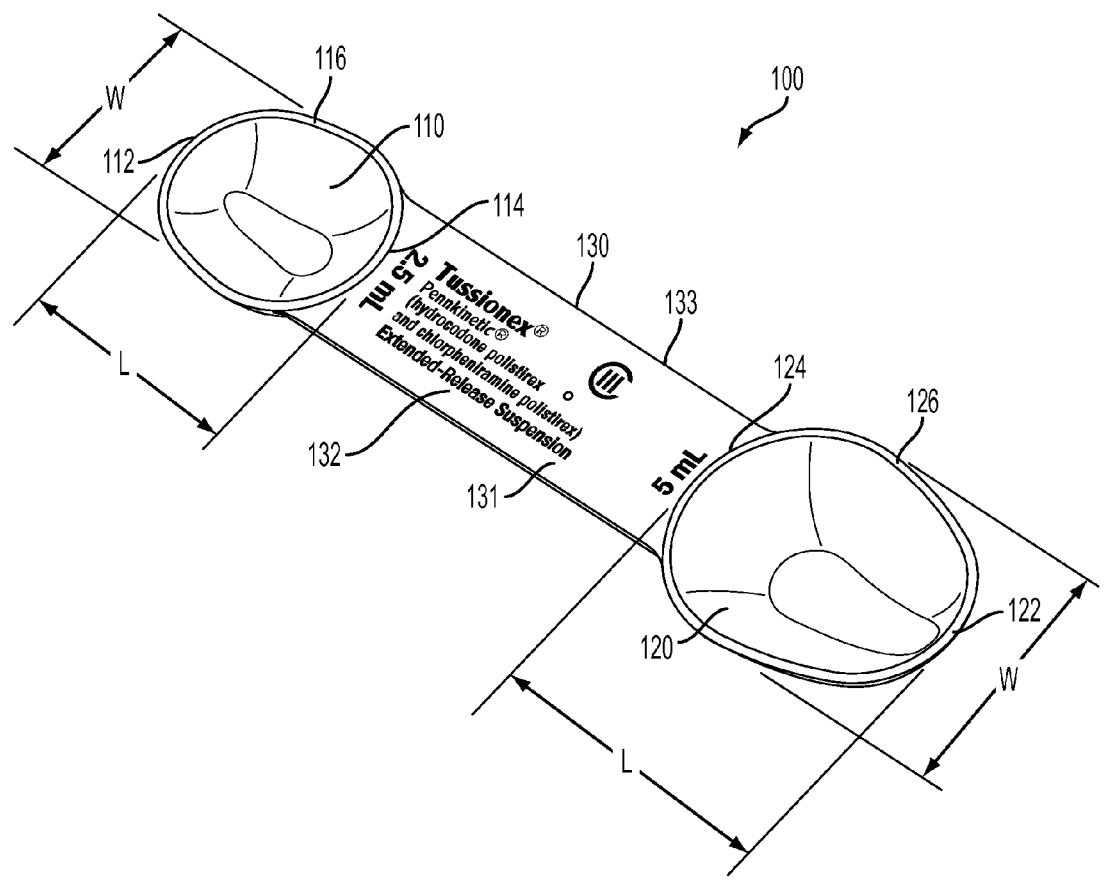
FIG. 1 illustrates a perspective view of an exemplary dosing spoon of the claimed invention.

Referring to FIG. 1, there is shown a dosing spoon 100. This dosing spoon 100 comprises a first bowl 110, a second bowl 120, and a handle portion 130. First bowl 110 has a front end 112, a back end 114, and a peripheral or top edge 116 extending along the circumference of the bowl. Second bowl 120 has a front end 122, a back end 124, and a peripheral or top edge 126 extending along the circumference of the bowl.

Handle portion 130 is defined by the back ends 114, 124, and a pair of parallel edges 131, 133. Handle portion 130 comprises a top surface 132 and a bottom surface 134 (shown in FIGS. 2 and 4).

First bowl 110 is sized and shaped such that it will contain a dosage in the amount of 2.5 mL when filled to the peripheral or top edge 116 with a substance having a specific gravity in the range of about 1.1300-1.1700. The volume of first bowl 110 is 2.53 cm$^3$. First bowl 110 comprises a maximum width W of approximately 2.46 cm, a maximum length L of approximately 2.90 cm, and a maximum depth of approximately 0.86 cm, measured from top edge 116 to a bottom surface 118 (shown in FIG. 2) of the bowl 110. The dimensions of this bowl render it deeper and narrower than a typical dosing spoon designated to contain 2.5 mL for which the dose was premeasured with water.

Second bowl 120 is sized and shaped such that a premeasured dosage volume of a liquid with a relative density in the range of about 1.1300-1.1700, when filled to top edge 126, will comprise the amount of 5.0 mL. The volume of second bowl 120 is 5.03 cm$^3$. Second bowl 120 preferably comprises a width W at its widest point of approximately 3.05 cm, a maximum length L of approximately 3.89 cm, and a maximum depth of approximately 1.02 cm, measured from top edge 126 to a bottom surface 128 (shown in FIG. 2) of the bowl 120. The dimensions of this bowl render it deeper and narrower than a typical dosing spoon for 5.0 mL for which the dose was premeasured with water.

Dosing spoon 100 may be a molded piece, wherein first bowl 110, second bowl 120, and handle 130 are integrally formed as a single part. As one example, dosing spoon 100 may be made from a plastic material, such as a polypropylene copolymer resin, and may be injection molded or extruded.

Writing may be present on the top surface 132 of handle 130, as shown in FIG. 1. Preferably, the writing is pad-printed with ink such that a color different from the spoon color may be applied, for ease of reading. Alternatively, other methods may be used to administer the writing on handle 130. For example, the writing may be molded onto the handle itself. This writing may include information about the drug to be administered, recycling information, dosing information, and various other statements. As can be seen in the writing in FIG. 1, the preferred drug to be administered with this particular dosing spoon is Tussionex®. The generic name for Tussionex® is chlorpheniramine and hydrocodone. Tussionex® comprises an approximate specific gravity in the range of about 1.1300-1.1700.

To administer a set dose, a user or caretaker pours the liquid into either first bowl 110 (if 2.5 mL is desired) or second bowl 120 (if 5.0 mL is desired). Preferably, the liquid is poured until the liquid level is flush with top edge 116 or 126 of the bowl. The user or caretaker will then administer the bowl into the patient's mouth for oral intake.

The dimensions of bowls 110, 120 have been designed to take into account the unique specific gravity range of a drug such as the drug Tussionex®. In this range of about 1.1300-1.1700, the surface tension of the liquid is different than that of water, which is traditionally used as a measuring medium to determine the size and shape of the spoon bowl for a desired volume of liquid. The surface tension of a liquid with a specific gravity in the range of about 1.1300-1.1700 causes the liquid to form a dome or arch above the plane formed by top edges 116, 126. Because of this phenomenon, the bowls 110, 120 have been designed with the dimensions described above to take into account the dome that forms, so that an accurate measurement of the drug can still be attained. In order to attain 2.5 mL of Tussionex® drug in first bowl 110, the shape of the bowl is configured as described above. And to attain 5.0 mL of the Tussionex® drug in second bowl 120, the shape of the bowl is configured as described above.

Figure 2:
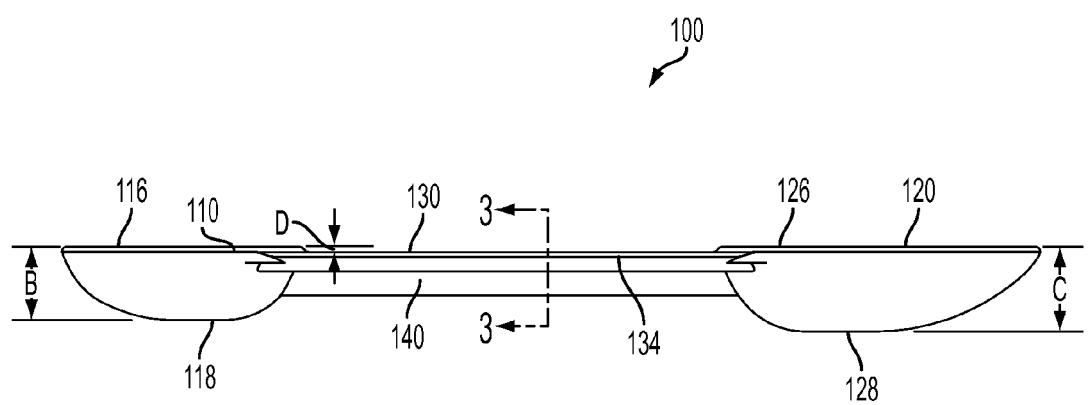
FIG. 2 illustrates a side view of the dosing spoon illustrated in FIG. 1.

FIG. 2 illustrates a side view of the dosing spoon depicted in FIG. 1. As can be seen in FIG. 2, a rib 140 extends from the bottom surface 134 of handle 130. Depth B of first bowl 110 may be less than the depth C of second bowl 120. In a preferable embodiment, depth B of first bowl 110 is approximately 0.86 cm, and depth C of second bowl 120 is approximately 1.02 cm.

As shown in FIG. 2, the handle is recessed from the top edges 116, 126 of both the first bowl 110 and the second bowl 120. The recess is demarcated by distance D, and may be approximately 0.08 cm.

Figure 3:
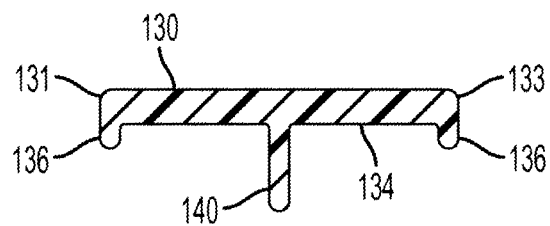
FIG. 3 illustrates a cross-sectional view along line 3-3 in FIG. 2.

FIG. 3 illustrates a cross-sectional view of the dosing spoon of FIG. 2, taken along line 3-3. This cross-sectional view further illustrates the shape of handle 130 and rib 140. Rib 140 may be located in the middle of the bottom surface 134 of handle 130.

Rib 140 may serve as a de-nesting feature to ensure that the spoon separates from adjacent spoons, thereby facilitating automated packaging. In this regard, rib 140 may extend 0.40 cm from the bottom surface 134 of handle 130 which is approximately 0.44 cm less than the bottom of second bowl 110.

In addition, rib 140 may also serve as a stiffening feature, to prevent dosing spoon 100 from being easily bent or broken. In addition, at edges 131, 133 extensions 136 may be present, also to aid in stiffening handle 130. These edge extensions 136 preferably extend orthogonally from edges 133, in the same direction as rib 140. Rib 140 preferably extends a further distance from the bottom surface 134 than the edge extensions 136.

Figure 4:
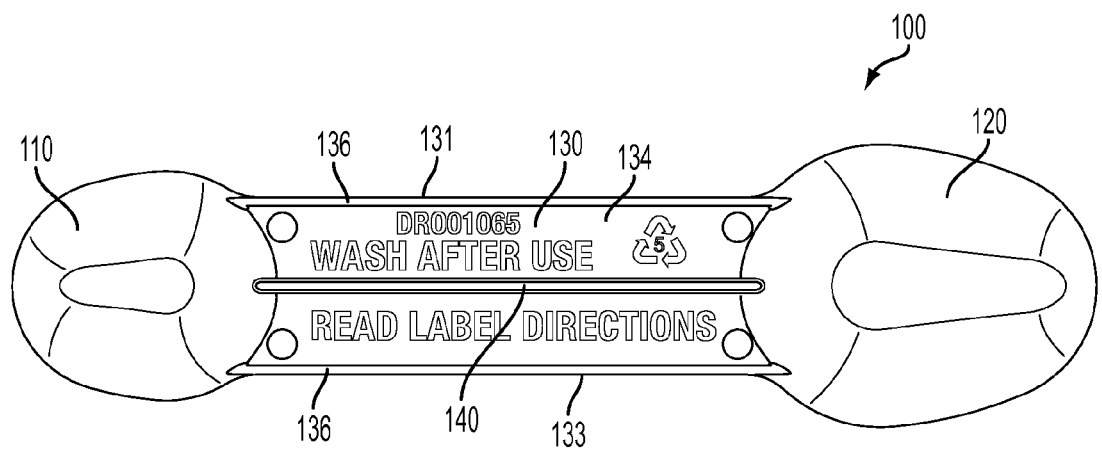
FIG. 4 illustrates a bottom view of the dosing spoon illustrated in FIG. 1.

FIG. 4 illustrates a bottom view of the dosing spoon 100 illustrated in FIG. 1. Bottom surface 134 of handle 130 may comprise a removable metal plate (not shown) that is molded into the plastic spoon during manufacturing. Writing may be present on the metal plate, with information regarding dosage, care and maintenance, recycling, and other information regarding the spoon.

Those of skill in the art will recognize alternative geometries of these features may also be used. For example, the thickness or length of the rib, edge extensions, or handle may be altered. A change in any of these features may alter the stiffness of the handle. More than one rib on the handle may be provided.

Although primarily aimed at the Tussionex® drug market, the Applicants' presently proposed dosing spoon may apply to other drugs with similar product characteristics, and Applicants' de-nesting feature may apply to any dosing spoon.

Applicants' proposed dosing spoon results in a number of advantages. The design of the bowls is such that drugs with a specific gravity in the range of about 1.1300-1.1700, when filled to the top edges of the bowls, will be administered with the proper dose. Therefore, the spoon reduces the likelihood that a user underdoses or overdoses the patient. In addition, the rib 140 on the bottom surface 134 of handle portion 130 serves as both a de-nesting feature and to stiffen the handle. Applicants' dosing spoon also results in a low cost mechanism since the mechanisms do not require a large number of parts and can be manufactured in a cost effective manner.

Exemplary embodiments of the present invention have been described. Those skilled in the art will understand, however, that changes and modifications may be made to these arrangements without departing from the true scope and spirit of the present invention, which is defined by the claims.

We claim:

1. A spoon, comprising:
   a bowl portion for oral administration to the patient, the bowl portion having a front end, a back end, a top edge along the circumference of the bowl, and a volume; and
   a handle portion having a first end and a second end, wherein the first end is connected to the back end of the bowl portion;
   wherein the bowl is dimensioned such that when liquid with a specific gravity in the range of about 1.1300-1.1700 is filled to the top edge of the bowl a dome effect results wherein a portion of the liquid arcs over a plane formed by the top edge, and the bowl contains a dose amount of 2.5 mL.

2. The spoon of claim 1 further comprising a second bowl portion for oral insertion into the patient, the second bowl portion having a front end, a back end, a top edge along the circumference of the second bowl, and a volume, wherein the second bowl is dimensioned such that when the liquid is filled to the top edge of the second bowl, the second bowl contains a dose amount of 5.0 mL.

3. The spoon of claim 2 wherein the handle second end is connected to the back end of the second bowl portion.

4. The spoon of claim 3 wherein the handle comprises a top surface, a bottom surface, a first parallel edge and a second parallel edge.

5. The spoon of claim 4 wherein the handle further comprises a rib extending essentially orthogonally from the bottom surface.

6. The spoon of claim 5 wherein the rib extends about 0.40 cm from the bottom surface.

7. The spoon of claim 3 wherein the first spoon bowl comprises a depth of approximately 0.86 cm and wherein the second spoon bowl comprises a depth of approximately 1.02 cm.

8. The spoon of claim 7 wherein the first spoon bowl comprises a width of approximately 2.46 cm and wherein the length from the front end to the back end is approximately 2.90 cm.

9. The spoon of claim 7 wherein the second spoon bowl comprises a width of approximately 3.05 cm and wherein the length from the front end to the back end is approximately 3.89 cm.

10. A dosage spoon, comprising:
    a first bowl portion for oral insertion having a first volume, a front end, a back end, and a top edge along the circumference of the first bowl;
    a second bowl portion for oral insertion having a second volume greater than the first volume, a front end, a back end, and a top edge along the circumference of the second bowl; and
    a handle portion having a first end and a second end, and a top surface and a bottom surface, wherein the first end is connected to the first bowl portion and the second end is connected to the second bowl portion;
    wherein the bowl portions are sized and shaped to be used with a substance having a specific gravity in the range of about 1.1300-1.1700 that forms a dome over a plane formed by the top edge when the substance is filled to the top edge.

11. The dosage spoon of claim 10 wherein the dosage of the first bowl portion of a substance with a specific gravity in the range of about 1.1300-1.1700 when the liquid is filled to the top edge of the first bowl portion is 2.5 mL, and the dosage of the second bowl portion of a substance with a specific gravity in the range of about 1.1300-1.1700 when the liquid is filled to the top edge of the second bowl portion is 5.0 mL.

12. The dosage spoon of claim 10, wherein the handle comprises a top surface, a bottom surface, a first parallel edge and a second parallel edge, and wherein at each edge an extension is formed, wherein each edge extension protrudes essentially orthogonally from the edge.

13. The dosage spoon of claim 11 wherein the handle further comprises a rib extending essentially orthogonally from the handle bottom surface.

14. The dosage spoon of claim 12 wherein the rib extends about 0.158 inches from the handle bottom surface.

15. The dosage spoon of claim 13 wherein the first spoon bowl comprises a depth of approximately 0.86 cm and wherein the second spoon bowl comprises a depth of approximately 1.02 cm.

16. The dosage spoon of claim 14 wherein the first spoon bowl comprises a width of approximately 2.46 cm and wherein the length from the front end to the back end is approximately 2.90 cm.

17. The dosage spoon of claim 15 wherein the second spoon bowl comprises a width of approximately 3.05 cm and wherein the length from the front end to the back end is approximately 3.89 cm.

18. The dosage spoon of claim 10 wherein the handle top surface is recessed from the top edges of first bowl and second bowl.

19. The dosage spoon of claim 10 wherein the top surface of the handle is below the top edges of the first and second bowl portions.

20. The dosage spoon of claim 12 wherein the edge extension protrudes in the same direction as the rib.

21. A dosing spoon for accurate administration of a liquid drug, comprising:
    a first bowl portion for oral insertion having a premeasured dosage volume and having a front end, a back end, and a peripheral bowl edge;
    a second bowl portion for oral insertion having a premeasured dosage volume and having a front end, a back end, and a peripheral bowl edge;
    a handle portion comprising a planar plate defined by a first end, a second end, a first parallel edge and a second parallel edge, the planar plate having a top and a bottom, wherein the first end is connected to the back end of the first bowl portion and the second end is connected to the back end of the second bowl portion; and
    a rib extending essentially orthogonally from the bottom of the planar plate;
    wherein the first bowl has a volume of approximately 2.53 cm$^3$ and can contain up to 2.5 mL of a liquid drug when the liquid drug is filled to the peripheral bowl edge, wherein a portion of the liquid arcs above a plane formed by the peripheral bowl edge due to the liquid having a relative density when compared with water of about 1.1300-1.1700, and the second bowl portion has a volume of approximately 5.03 cm$^3$ and can contain up to 5.0 mL of the liquid drug when the liquid drug is filled to the peripheral bowl edge, wherein a portion of the liquid arcs above a plane formed by the peripheral bowl edge due to the liquid having a relative density when compared with water of about 1.1300-1.1700.

22. The dosing spoon of claim 21, wherein the liquid drug is chlorpheniramine and hydrocodone.

* * * * *